United States Patent [19]

Dubost

[11] Patent Number: 5,297,823
[45] Date of Patent: Mar. 29, 1994

[54] DEVICE FOR FIXING A TUBULAR ELEMENT ON A TUBULAR CONNECTING SPIGOT OF A COMPONENT OF IN PARTICULAR AN AUTOMOBILE VEHICLE

[75] Inventor: Dominique Dubost, La Celle Saint Cloud, France

[73] Assignee: ATTAX, Chatou, France

[21] Appl. No.: 836,833

[22] Filed: Feb. 19, 1992

[30] Foreign Application Priority Data

Feb. 20, 1991 [FR] France ................ 91 02038

[51] Int. Cl.⁵ .................................... F16L 37/00
[52] U.S. Cl. ................... 285/317; 285/308; 285/23; 285/321; 285/243
[58] Field of Search ........... 285/23, 307, 308, 317, 285/319, 320, 243, 244, 321, 323

[56] References Cited

U.S. PATENT DOCUMENTS

| 2,465,197 | 3/1949 | Chatham | 285/317 |
|---|---|---|---|
| 3,439,944 | 4/1969 | Leutenegger | 285/321 |
| 3,887,222 | 6/1975 | Hammond | 285/307 |
| 4,362,323 | 12/1982 | Lodder et al. | 285/23 |
| 4,613,172 | 9/1986 | Schattmaier | 285/308 |
| 4,691,943 | 9/1987 | Deland et al. | 285/308 |
| 4,850,622 | 7/1989 | Suzuki | 285/308 |
| 5,005,877 | 4/1991 | Hayman | 285/317 |
| 5,033,777 | 7/1991 | Blenkush | 285/317 |
| 5,048,874 | 9/1991 | Ohlsson | 285/319 |
| 5,131,687 | 7/1992 | Marchou | 285/23 |

FOREIGN PATENT DOCUMENTS

| 373920 | 6/1990 | European Pat. Off. | |
| 86404 | 1/1959 | Netherlands | 285/307 |
| 7312793 | 7/1978 | Switzerland | 285/23 |

OTHER PUBLICATIONS

Machine Design, vol. 53, No. 24, Oct. 1981, p. 46, Cleveland, Ohio, "Push-In Fitting Seals Pneumatic Tubing".

Primary Examiner—Eric K. Nicholson
Attorney, Agent, or Firm—Sughrue, Mion, Zinn, Macpeak & Seas

[57] ABSTRACT

This device, in which the tubular element (1) is fixed to the spigot (2) by maintaining and sealing means (4), is characterized in that the maintaining and sealing means comprise two sleeves (5,6) coaxial with the spigot, one of the sleeves being an outer sleeve (5) connected to the component (3) and comprising resiliently deformable branches (10,11) biased in the direction toward the spigot, there being provided at the end of each branch a hooking portion projecting inwardly of the outer sleeve, and the other sleeve being an inner sleeve (6) comprising an abutment surface (7) and mounted to be axially movable between the outer sleeve (5) and the spigot (2) by the bearing of the tubular element (1) against the abutment surface (7), between a mounting position in which the inner sleeve (6) maintains the branches (10,11) of the outer sleeve (5) spaced away from the spigot (2), and a hooking position in which the inner sleeve releases the branches (10,11) of the outer sleeve (5), so that the hooking portions of the branches cooperate with the tubular element (1) and maintain it in position on the spigot (2).

8 Claims, 3 Drawing Sheets

DEVICE FOR FIXING A TUBULAR ELEMENT ON A TUBULAR CONNECTING SPIGOT OF A COMPONENT OF IN PARTICULAR AN AUTOMOBILE VEHICLE

BACKGROUND OF THE INVENTION

The present invention relates to a device for fixing a tubular element on a tubular connecting spigot of a component, of use in particular in the automobile industry.

The device according to the invention may thus be employed for example for connecting a cooling radiator to an engine of an automobile vehicle.

Modern automobile vehicles comprise a bonnet or hood which is becoming increasingly streamlined to improve the coefficient of penetration of the vehicle in the air.

Space available under the bonnet for the radiator is consequently reduced relative to older vehicles.

The water of the cooling circuit is consequently relatively less cooled on modern vehicles and this water is during the operation of the vehicle at a pressure and temperature which are substantially higher than the pressure and temperature of the water in cooling circuits of older vehicles.

This increase in pressure results in risk of leakage in the region of the joints between the flexible connecting pipes and the rigid connecting spigots, for example connecting the radiator to the engine.

In the art, the flexible connecting pipe or connector is engaged on the corresponding rigid spigot and fixed in a sealed manner on the latter by a clamping collar placed around the flexible connector.

The clamping collars employed may be of different types.

Resilient collars are for example employed, but these collars do not ensure a very good seal when the pressure in the cooling circuit is substantially higher than atmospheric pressure.

Moreover, these resilient collars require the use of specific tools for mounting and dismounting the collars.

Clamping collars including a rack system may also be employed, but these collars also require the use of a specific tooling for mounting and dismounting the collars.

Further, dismounting such collars is a very difficult operation.

It is also possible to employ collars having a screw disposed tangentially, but these collars are very difficult to place correctly in position on the connector and the spigot. Moreover, the correct clamping of these collars cannot be visually checked.

Consequently, the joint devices of cooling circuits, in which the flexible connectors are fitted on the rigid spigots of the circuit and clamped by collars, are unsatisfactory under present conditions, that is, in the case of cooling circuits operating at high pressure. Further, these devices cannot be mounted in an automatic manner.

SUMMARY OF THE INVENTION

An object of the invention is therefore to overcome these problems.

To this end, the invention provides a device for fixing a tubular element on a tubular connecting spigot of a component, of in particular an automobile vehicle, in which the tubular element is fixed on the spigot by maintaining and sealing means, characterized in that the maintaining and sealing means comprise two sleeves coaxial with the spigot, one of the sleeves being an outer sleeve and connected to the component and comprising resiliently deformable branches biased in a direction toward the spigot, there being provided at the end of each branch a hooking portion projecting inwardly of the sleeve, and the other sleeve being an inner sleeve and comprising an abutment surface and mounted to be axially movable between the outer sleeve and the spigot by the bearing of the tubular element on the abutment surface of the inner sleeve, between a mounting position in which the inner sleeve maintains the branches of the outer sleeve spaced further away from the spigot, and a hooking position in which the inner sleeve releases the branches of the outer sleeve so that the hooking portions of the branches cooperate with the tubular element and maintain it in position on the spigot.

A better understanding of the invention will be had from the following description which is given solely by way of example with reference to the accompanying drawings in which:

DESCRIPTION OF A PREFERRED EMBODIMENT

Figure 1:
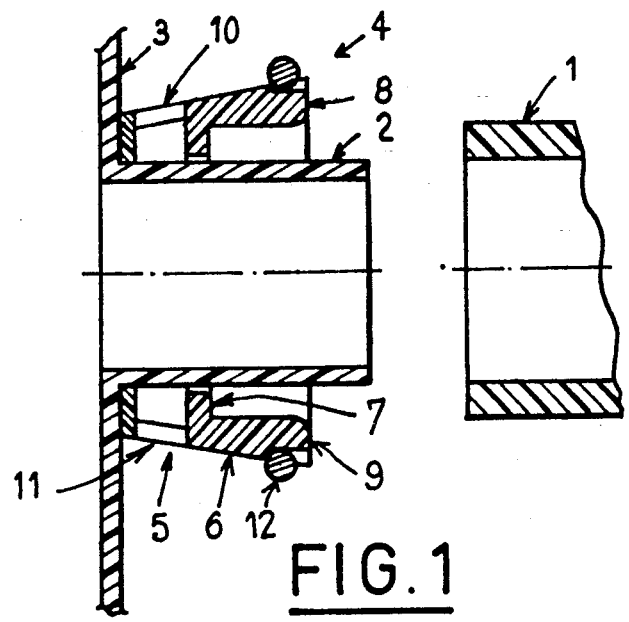
FIG. 1 is a sectional view of a fixing device according to the invention in the mounting position.

As shown in these Figures, the fixing device according to the invention may be used for fixing a tubular element 1 on a tubular connecting spigot 2 of a component 3, of for example an automobile vehicle.

For example, this device may be employed for fixing an end of a flexible connecting pipe—whose other end is connected to an engine of an automobile vehicle—on a rigid tubular spigot of a cooling radiator for the engine.

In the fixing device according to the invention, the tubular element 1 is fixed on the spigot by maintaining and sealing means generally designated by the reference character 4 in the Figures.

According to the invention, these maintaining and sealing means comprise two sleeves 5 and 6 coaxial with the spigot, one of the sleeves being an outer sleeve 5 and connected to the component by any suitable means such as, for example, gluing, screwing, etc., and the other sleeve being an inner sleeve 6 mounted to be axially movable between the outer sleeve 5 and the connecting spigot 2.

The inner sleeve 6 comprises an abutment surface 7 provided for example at one of the ends of the sleeve, and for example thrust or stop portions 8 and 9 at the other end of the sleeve, the function of which will be described in more detail hereinafter.

The outer sleeve 5 comprises branches, for example 10 and 11, which are resiliently deformable and biased in a direction toward the spigot 2. This sleeve may for example comprise four branches spaced 90° apart from one another.

These branches may be for example biased in the direction toward the spigot by a resilient ring 12 extending around the corresponding end of the spigot.

Figure 4:
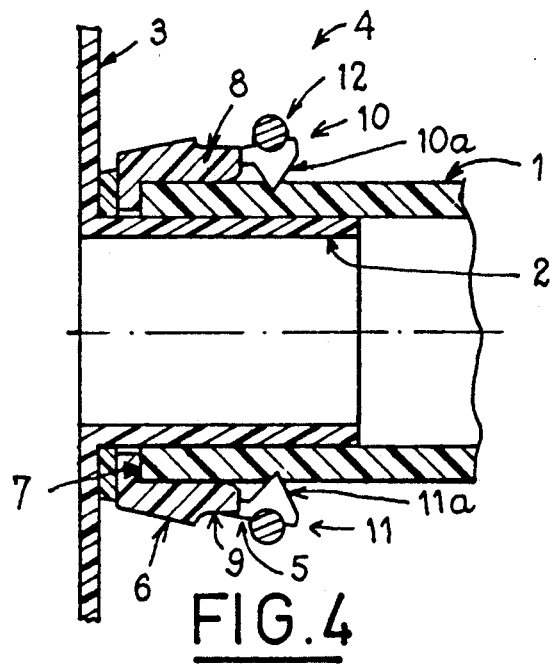
FIG. 4 is a sectional view of the fixing device according to the invention in the hooking position.

As shown more clearly in FIG. 4, the end of each of these branches of the outer sleeve 5 includes a hooking portion, 10a, 11a for example, projecting inwardly of the sleeve.

Figure 2:
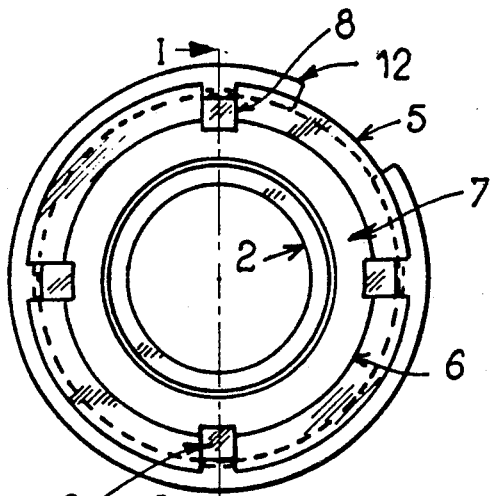
FIG. 2 is an end elevational view of the fixing device shown in FIG. 1.
Figure 3:
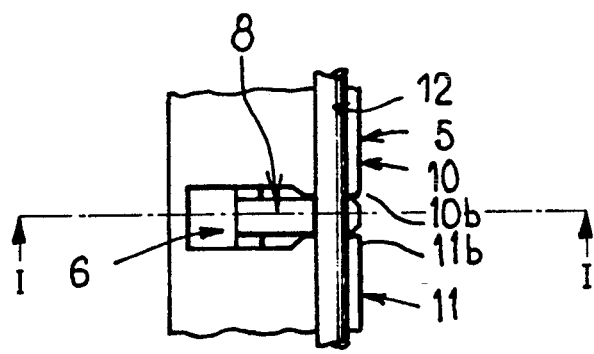
FIG. 3 is a detail view of a part of the fixing device shown in FIG. 1.
Figure 5:
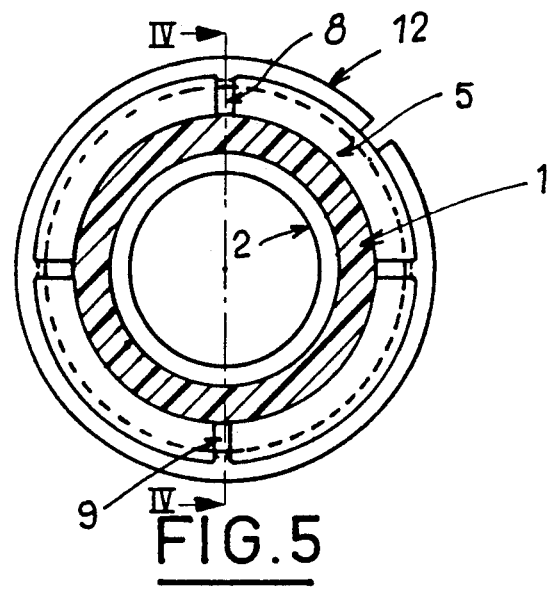
FIG. 5 is an end elevational view of the device shown in FIG. 4.
Figure 6:
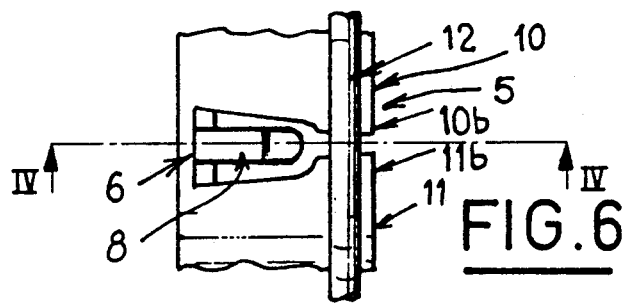
FIG. 6 is a detail view of a part of the fixing device shown in FIG. 4.
Figure 7:
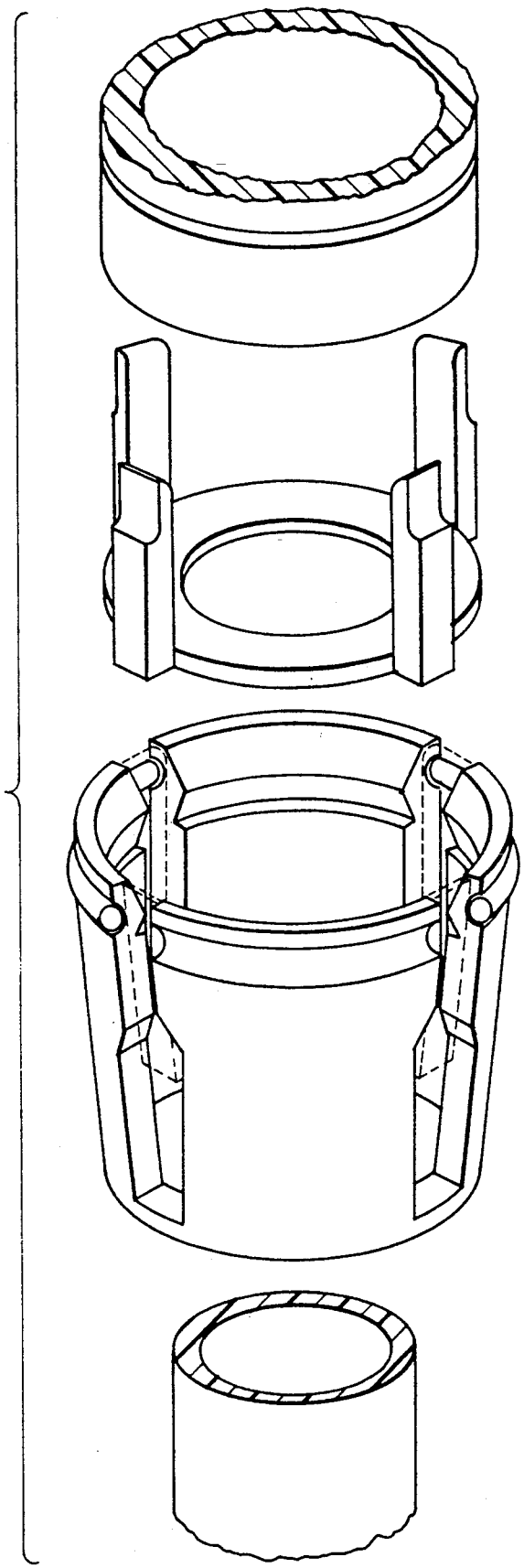
FIG. 7 is an exploded perspective view showing separated inner and outer sleeves of the device.

As shown in the Figures, the inner sleeve 6 is mounted to be axially movable between the outer sleeve 5 and the spigot 2 by the bearing of the tubular element 1, and more specifically of the end of the latter, on the abutment surface 7 of the inner sleeve 6, between a mounting position of the tubular element around the spigot shown in FIGS. 1 to 3, in which the thrust portions 8, 9 of the inner sleeve 6 extend between the ends of the branches of the outer sleeve in the region of the hooking portions of the branches, so as to maintain the branches of the outer sleeve spaced further away from the spigot and thereby permit the engagement of the tubular element 1 on the spigot 2, and a hooking position, shown in FIGS. 4 to 6, in which the thrust portions 8 and 9 of the inner sleeve release the branches of the outer sleeve so that the projecting portions of the branches can cooperate with the tubular element 1 and thereby hold it in position on the spigot.

More particularly, the thrust portions 8, 9 of the inner sleeve 6 extend, in the mounting position of the inner sleeve, between bosses 10b and 11b (FIG. 3) which laterally project from confronting faces of the corresponding ends of the branches 10 and 11 of the outer sleeve 5. This permits maintaining these branches in a position spaced further away from the spigot 2 to permit the passage of the tubular element around the latter.

The inner sleeve 6 advantageously comprises four thrust portions each extending between two successive branches of the outer sleeve.

The engagement of the tubular element around the spigot brings the end of the tubular element into contact with the abutment surface 7 of the inner sleeve 6 so that, if the user continues to displace this tubular element, the inner sleeve 6 is moved toward the hooking position shown in FIGS. 4 to 6.

This displacement of the inner sleeve 6 and therefore of the thrust portions 8 and 9 of the latter, releases the branches 10 and 11 of the outer sleeve so that, under the effect of the resilient biasing exerted by the resilient ring 12, these branches are moved toward the spigot 2 so that the projecting hooking portions of the branches come into a position of cooperation with the tubular element 1 and thereby clamp the latter against the spigot and hold it in position.

It will indeed be understood, as can be seen in FIGS. 3 and 6, that the sliding of the inner sleeve 6 causes the thrust portions 8 and 9 of the latter to slide between the branches 10 and 11 of the outer sleeve 5 from an active position (FIG. 3) between the bosses 10b and 11b of the branches of the outer sleeve, to a retracted position (FIG. 6) in a slot portion between the branches whose width is larger than the distance between the bosses 10b and 11b so that these thrust portions no longer prevent the branches of the outer sleeve from moving toward one another and thereby hooking the tubular element 1 on the spigot 2.

Note in this respect that the projecting hooking portions 10a and 11a of these branches may have inclined faces facilitating their engagement and improving the maintenance of the tubular element on the spigot.

It will of course be clear that other embodiments of the thrust portions of the inner sleeve may be envisaged.

Note also that, in the mounting position, the outer sleeve has a generally frustoconical shape which is open in the direction toward the tubular element for facilitating its engagement on the spigot.

It is also clear that, although in the described embodiment the inner sleeve 6 comprises thrust portions 8 and 9 for maintaining spaced apart or releasing the branches 10 and 11 of the outer sleeve 5, the maintenance of the branches in a position spaced further away from the spigot and the releasing of these branches may be achieved by any other part of the inner sleeve, such as for example an end portion of the latter against which the projecting hooking portions 10a and 11a of the branches 10 and 11 of the outer sleeve 5 bear in the mounting position.

What is claimed is:

1. Device for fixing a tubular element on a tubular connecting spigot of a component, in which device maintaining and sealing means are cooperative with said tubular element and said spigot for fixing said tubular element on said spigot, said maintaining and sealing means comprising two sleeves which are coaxial with said spigot, one of said sleeves being an outer sleeve connected to said component and comprising resiliently deformable branches biased in a direction toward said spigot, a hooking portion projecting inwardly of said outer sleeve being provided at the end of each of said branches, the other of said sleeves being an inner sleeve and comprising an abutment surface and mounted to be axially movable between said outer sleeve and said spigot by a bearing of said tubular element against said abutment surface of said inner sleeve, between a mounting position in which said inner sleeve maintains said branches of said outer sleeve spaced further away from said spigot, and a hooking position in which said inner sleeve releases said branches of said outer sleeve, so that said hooking portions of said branches become cooperative with said tubular element and thereby maintain it in position on said spigot.

2. Device according to claim 1, wherein, in said mounting position, said outer sleeve has a divergent shape open in a direction toward said tubular element.

3. Device according to claim 1, wherein said inner sleeve comprises in proximity to a first end of said inner sleeve thrust portions cooperative with said branches for selectively maintaining and releasing said branches of said outer sleeve.

4. Device according to claim 3, wherein said abutment surface of said inner sleeve is provided on an end of said inner sleeve remote from said first end comprising said thrust portions.

5. Device according to claim 3, wherein, in said mounting position, said thrust portions of said inner sleeve extend between ends of said branches of said outer sleeve in the region of said hooking portions of said branches.

6. Device according to claim 5, comprising lateral bosses on end portions of said branches, said thrust portions of said inner sleeve being mounted to be slidably movable between said branches of said outer sleeve, between an active position in which said branches cooperate with said lateral bosses so as to maintain said branches in the mounting position of said tubular element, and a retracted position for releasing said branches.

7. Device according to claim 1, further comprising a resilient ring located around said branches of said outer sleeve adjacent an end of said branches for biasing said branches in a direction toward said spigot.

8. Device according to claim 3, wherein said outer sleeve comprises four of said resiliently deformable branches and said inner sleeve comprises four of said thrust portions each extending between two successive branches of said branches.

* * * * *